Aug. 14, 1945.　　　C. G. TAYLOR　　　2,382,349
METHOD OF MAKING SELF-ALIGNING BEARINGS
Filed Aug. 23, 1943
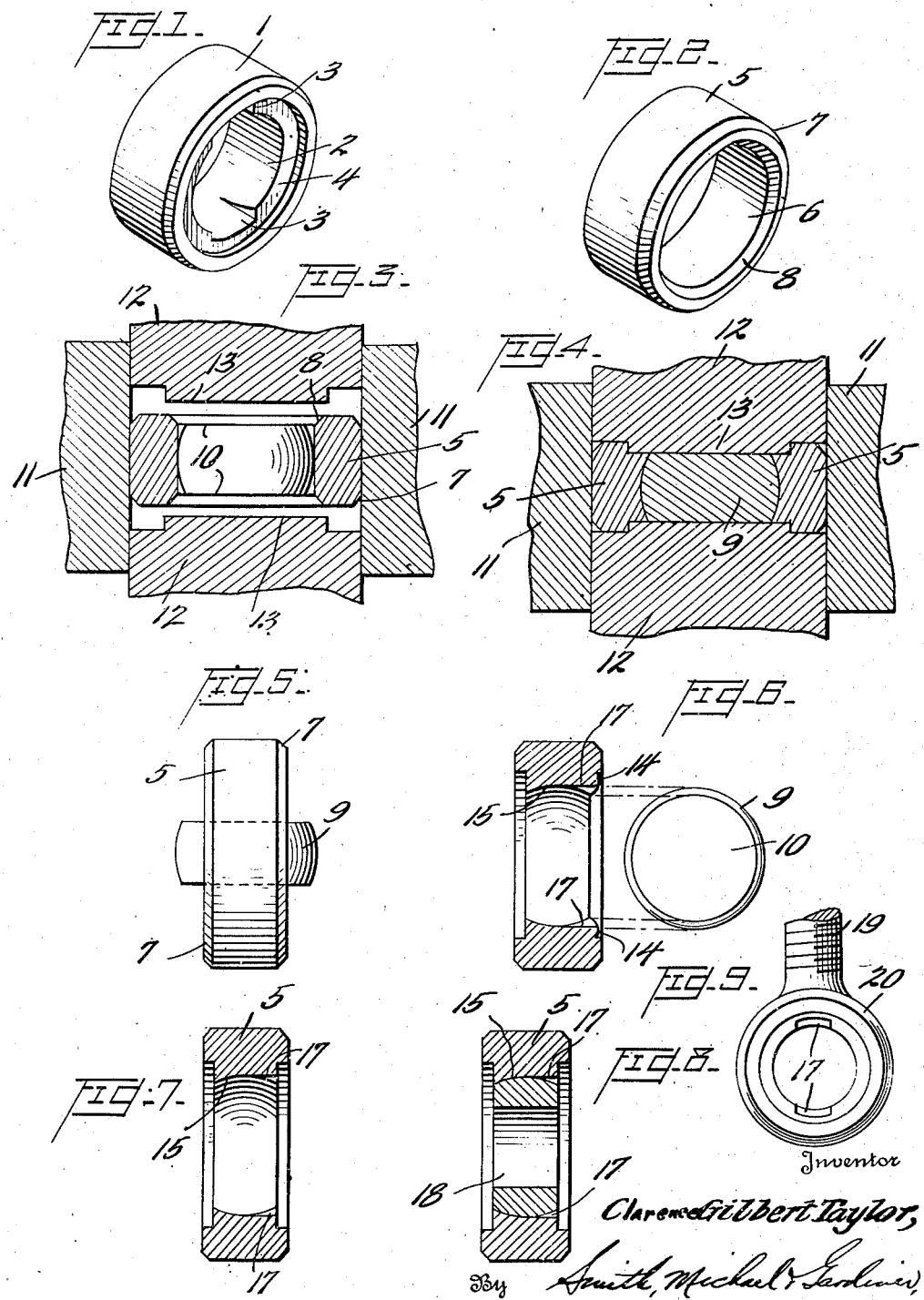
Inventor
Clarence Gilbert Taylor,
By Smith, Michael & Gardiner
Attorneys.

Patented Aug. 14, 1945

2,382,349

UNITED STATES PATENT OFFICE 2,382,349

METHOD OF MAKING SELF-ALIGNING BEARINGS

Clarence Gilbert Taylor, Alliance, Ohio

Application August 23, 1943, Serial No. 499,688

7 Claims. (Cl. 29—148)

This invention is a method of making outer ring members for self-aligning bearings, either plain or antifriction. The outer ring members of self-aligning bearings are characterized by an inner spherical surface on which the inner bearing member moves, said inner spherical surface being intercepted by diametrically opposed kerfs or lands by which the inner bearing member may be entered within the outer ring. Heretofore, so far as is known, the outer bearing member has been made by a plurality of costly, and somewhat complicated, machine operations, but it is the purpose of the present invention to simplify the manufacturing steps in making these ring members to thereby reduce the overall cost of production. The outer ring members made in accordance with the present process may be ring members independent of any supporting structure, or they may be ring members secured to or formed as an integral part of threaded rods or similar supporting structure.

The invention contemplates providing a former member having the general exterior contour of the inner bearing member which will be used with the outer bearing member when completed, and shaping an outer ring member around the former member by pressure applied axially of the ring member.

The invention further contemplates separating an outer ring member, the metal of which has been pressed into forming contact with an inner spherical former member, in a manner to form the diametrically opposed kerfs or lands by which the inner bearing member may be associated with the formed outer ring member.

These and other objects of the invention will become apparent from the following specification read in connection with the accompanying drawing, wherein a preferred method of carrying out the invention has been illustrated.

In the accompanying drawing:

Figure 1 is a perspective view of an outer ring member of a self-aligning bearing;

Fig. 2 is a perspective view of the outer ring member before being processed in accordance with the present invention;

Fig. 3 is a fragmentary sectional view of a press with the ring and former member in position to be operated upon;

Fig. 4 is a view similar to Fig. 3, showing the position of the parts after working pressure has been applied;

Fig. 5 is a side elevation of the formed outer ring with the former member turned 90°;

Fig. 6 is a sectional view showing the mode of ejecting the former member from the outer ring;

Fig. 7 is a sectional view of the completed outer ring;

Fig. 8 is a sectional view of a complete self-aligning plain bearing, and

Fig. 9 is a fragmentary elevation of a ring member formed as a part of a supporting rod or structure.

Referring more particularly to the drawing, Fig. 1 shows in perspective, the conventional form of outer ring member for self-aligning bearings, said ring member comprising a generally cylindrical sleeve 1, having the inner surface thereof provided with the generally spherical bearing surface 2. The bearing surface 2 is cut or mutilated at diametrically opposed points by kerfs or lands 3, which extend parallel to the axis of the ring member and from one outer end face 4 thereof substantially half-way through the spherical bearing surface 2. The kerfs 3 are provided to permit the inner bearing member to be operatively associated with the outer member which is done by entering the inner bearing member within these lands edgewise, and then turning the inner bearing member 90° about an axis transverse to the axis of the outer ring member to bring the spherical surface of the inner and outer bearing members into engagement. This mode of assembling the inner and outer members of the bearing is old and well known.

As previously stated, the invention contemplates the pressure flow of metal of a outer ring member about an inner former member. The outer ring member employed in the present method is shown in Fig. 2 as comprising a substantially cylindrical sleeve member 5, having a cylindrical bore 6. The outer diameter of the sleeve member 5 is substantially that of the completed ring member while the diameter of the bore 6 is substantially that of the to-be-formed spherical surface. The end faces of the sleeve 5 may be beveled as at 7 and 8, if desired, but this is not essential or necessary.

The former member 9 to be used for shaping and providing an inner spherical surface within the sleeve member 5 is shown in Figs. 3 and 6 as comprising a sphere, the opposite polar extremities of which have been cut away along spaced parallel planes to form flat end faces 10. The diameter of the spherical portion of the former member 9 is such as to fit snugly within the cylindrical bore of the sleeve member 5, so that the former member 9 may be inserted within the sleeve 5 as shown in Fig. 3. In assembling the sleeve 5 and former member 9 for delivery to pressure applying means, such as a coin press, the former member 9 is disposed mid-way between the ends of the sleeve 5 with the flat end faces 10 of the former member lying perpendicularly of the axis of the sleeve.

With the parts 5 and 9 thus assembled they are placed within a suitably dimensioned bed-piece 11, of a coin press, or other suitable pressure applying apparatus, said bed-piece being provided with a recess dimensioned to snugly receive the sleeve member 5 and retain it against lateral deformation when pressure is applied thereto. Associated with the bed-piece 11 are suitable dies or plungers 12, operating within the recess of the bed-piece 11, said die members having centrally disposed projections 13. The relative position and dimension of the parts prior to application of pressure is clearly shown in Fig. 3, it being noted that the projections 13 are of lesser diameter than the outer dimension of the ring member 5. When pressure is applied to the members 12 in any suitable manner, the projections 13 carried thereby engage the end portions of the sleeve 5 adjacent the periphery of the bore 6 thereof at opposite ends, causing the metal of the sleeve to flow downwardly and inwardly about the spherical surface of the former member 9 to impart a corresponding shape and contour to the inner surface of the ring member 5. During this operation it should be noted that the faces 10 of the plungers 12 engage opposite end faces 10 of the former member 9 to prevent metal of the sleeve 5 flowing over thereonto. This application of pressure to the end portions of the sleeve 5 as described is of sufficient magnitude to completely and accurately conform the inner surface of the sleeve 5 to the spherical surface of the former member 9 as clearly shown in Fig. 4.

The ring 5 and the former member 9 are then removed from the press and the former member is turned 90° about an axis perpendicular to the axis of the sleeve to a position shown in Fig. 5. The sleeve 5 and the former member 9 are then moved relatively in a direction axially of the sleeve to free the former member from the sleeve. This operation may be performed in any suitable jig or press, it being essential only that the former member 9 be forced from the confining lip of the spherical surface within the member 5 by pressure applied thereto in a direction along the axis of the sleeve 5. This step is illustrated in Fig. 6 of the drawing and results in burring or rolling of the metal of the sleeve at dimetrically opposed points, as shown at 14. The former member 9 in emerging edgewise from the confines of the spherical surface 15 of the formed ring member, forms or cuts dimetrically opposed kerfs or lands 17 in the inner surface of the ring member as clearly shown in Fig. 6. To this end, the thickness or axial dimension of the former member 9, that is, the distance between the end faces 10 thereof, is substantially equal to the axial length of the inner bearing member to be used with the finished ring member so that the lands or kerfs 17 cut by the former member 9, as described, will properly accommodate the inner bearing member when assembled.

In completing the outer ring member, it is desirable, although not essential, to remove the burred metal 14, as shown in Fig. 6, in order to provide a smooth, even end face for the ring member. The outer ring member, following the removal of the burred metal 14 is shown in Fig. 7. The removal of the burr 14 may be done by any suitable machining or grinding operation.

Fig. 8 shows the completed outer ring member with a conventional plain inner bearing member 18 assembled therewith.

The sleeve 5 from which the outer ring member is made may be formed of any desired or suitable metal such as a mild steel which flows readily under moderate pressure, while the former member 9 is made of harder metal so as to resist deformation under repeated applications of pressure.

When the outer ring member of the bearing is formed as a part of or integral with a supporting member such as the screw-threaded rod 19 shown in Fig. 9, the process is conducted in the same manner, it being obviously necessary to provide the bed 11 of the press with a recess to take the laterally extending rod portion 19 of the ring member 20. A former member 10 similar to that shown in Figs. 3 and 4 is associated with the ring member 20 in the manner hereinbefore described and the heads or die members 12 manipulated to compress the metal of the ring 20 into pressure-forming contact with said former member.

It will be understood from the foregoing that throughout the specification and claims where I refer to a "ring member" I consider this term broadly in the sense to comprehend a ring member per se as shown in Fig. 2 or the ring member 20 formed as a part of or secured to a supporting rod such as 19.

From the foregoing it is apparent that means are provided by the present method for rapidly and cheaply manufacturing outer ring members for self-aligning bearings, in that all of the costly machine operations previously employed incident to cutting and grinding the inner spherical surfaces and intercepting kerfs and lands are dispensed with, and in lieu thereof a single application of pressure in a suitable die press forms the spherical surface about an inner former member which, when removed from the ring edgewise, as described, cuts or otherwise forms the entering kerfs or lands for the inner bearing member.

Having thus described the invention, what is claimed as new is:

1. The method of making the outer ring member of a self-aligning bearing comprising providing a sleeve member having a substantially cylindrical bore and providing a former member having a spherically formed edge portion, placing the former member within the bore of the sleeve, pressing the metal of the sleeve into pressure-forming contact with the spherical edge of the former member to form on the inner surface of the sleeve a spherical surface corresponding to that of the former member, turning the former member within the spherically formed surface of the sleeve through an angle of substantially 90° about an axis substantially perpendicular to the axis of the sleeve and then removing the former member from the sleeve by relatively moving the former member and sleeve generally along the axis of the sleeve.

2. The method of making the outer ring of a self-aligning bearing comprising providing a sleeve member having a substantially cylindrical bore and providing a former member dimensioned to fit snugly within the bore of the sleeve and having a spherically formed edge portion and substantially flat end faces, placing the former member within the cylindrical bore of the sleeve with the end faces of the former member substantially perpendicular to the axis of the sleeve, and pressing the metal of the sleeve into pressure forming contact with the spherical edge of the former member to form on the inner surface of the sleeve a spherical surface corresponding to that of the former member, turning said former member within said spherically formed surface of the sleeve until the end faces of the former member are substantially parallel to the axis of the sleeve and then removing the former member from the sleeve by forcibly separating the sleeve and former member along a line conforming generally to the axis of the sleeve.

3. The method of making the outer ring of a self-aligning bearing, comprising providing a sleeve member having a cylindrical bore and providing a former member dimensioned to fit snugly within the bore of the sleeve and having a spherically formed edge portion and substantially flat end faces, placing the former member within the cylindrical bore of the sleeve with the end faces of the former member substantially perpendicular to the axis of the sleeve, and pressing the metal of the sleeve into pressure forming contact with the spherical edge of the former member to form on the inner surface of the sleeve a spherical surface corresponding to that of the former member, turning the former member substantially 90° about an axis perpendicular to the axis of the sleeve, and forcing the former member out of the sleeve by pressure applied thereto in the direction axially of the sleeve.

4. The method of making the outer ring of a self-aligning bearing, comprising providing a sleeve member having a cylindrical bore and providing a former member dimensioned to fit snugly within the bore of the sleeve and having a spherically formed edge portion and substantially flat end faces, placing the former member within the cylindrical bore of the sleeve with the end faces of the former member substantially perpendicular to the axis of the sleeve, and pressing the metal of the sleeve into pressure forming contact with the spherical edge of the former member to form on the inner surface of the sleeve a spherical surface corresponding to that of the former member, turning the former member substantially 90° about an axis perpendicular to the axis of the sleeve and then relatively moving the sleeve and former member along the axis of the sleeve to free the former member from the sleeve.

5. The method of making an outer ring of a self-aligning bearing comprising providing a sleeve member having a cylindrical bore and providing a former member dimensioned to fit snugly within the bore of the sleeve and having a spherically formed edge portion and substantially flat end faces, placing the former member within the cylindrical bore of the sleeve with the end faces of the former member substantially perpendicular to the axis of the sleeve, and pressing the metal of the sleeve into pressure forming contact with the spherical edge of the former member to form on the inner surface of the sleeve a spherical surface corresponding to that of the former member, turning the former member substantially 90° about an axis perpendicular to the axis of the sleeve, relatively moving the sleeve and former member along the axis of the sleeve to free the former member from the sleeve and then removing the burred metal of the sleeve at the dimetrically opposite points on the end of the sleeve from which the former member was ejected.

6. The method of making the outer ring of a self-aligning bearing, comprising providing a sleeve member having a cylindrical bore of substantially the diameter of the spherical surface to be formed therein, and providing a former member having a spherical edge portion and dimensioned to fit snugly within the bore of the sleeve, placing the former member within the bore of the sleeve mid-way between the ends thereof and with the spherical edge portion thereof disposed symmetrically with respect to the inner cylindrical surface of the sleeve, then while confining the sleeve against outward deformation, applying pressure against the ends of the sleeve in an axial direction to cause the metal of the sleeve to flow inwardly into pressure-forming contact with substantially the entire spherical edge portion of the former member to correspondingly shape the inner surface of the sleeve, turning the former member 90° about an axis perpendicular to the axis of the sleeve and then relatively moving the sleeve and former member in a direction axially of the sleeve to free the former member from the sleeve, then removing the burred metal from the end of the sleeve at the diametrically opposite points at which the edge portions of the former member emerged from the spherically formed surface of the sleeve.

7. The method of making the outer ring member of a self-aligning bearing, comprising providing a sleeve member having a cylindrical bore of substantially the diameter of the spherical surface to be formed therein, and providing a former member in the form of a sphere having opposite polar extremities cut away along spaced parallel planes defining flat end faces, said end faces being spaced apart a distance corresponding to the distance between opposite ends of the inner bearing member with which the outer ring is to be used, placing the former member within the bore of the sleeve midway between the ends thereof with the flat end faces of the former member substantially perpendicular to the axis of the sleeve, then while confining the sleeve against outward deformation applying axially directed pressure against the end portions of the sleeve to cause the metal of the sleeve to flow inwardly into pressure-forming contact with substantially the entire spherical edge portion of the former member, shielding the end faces of the former member against flow of metal thereonto, turning the former member 90° about an axis substantially perpendicular to the axis of the sleeve, moving the former member axially of the sleeve to remove it from the sleeve, then finishing the end of the sleeve from which the former member was ejected to remove the burred metal formed at diametrically opposite points thereof.

CLARENCE GILBERT TAYLOR.